April 5, 1949.    H. S. EWING    2,466,015
APPARATUS FOR LOCATING REFLECTING SURFACES AND
FOR MEASURING THE CURVATURES THEREOF
Filed Sept. 29, 1944    3 Sheets—Sheet 1
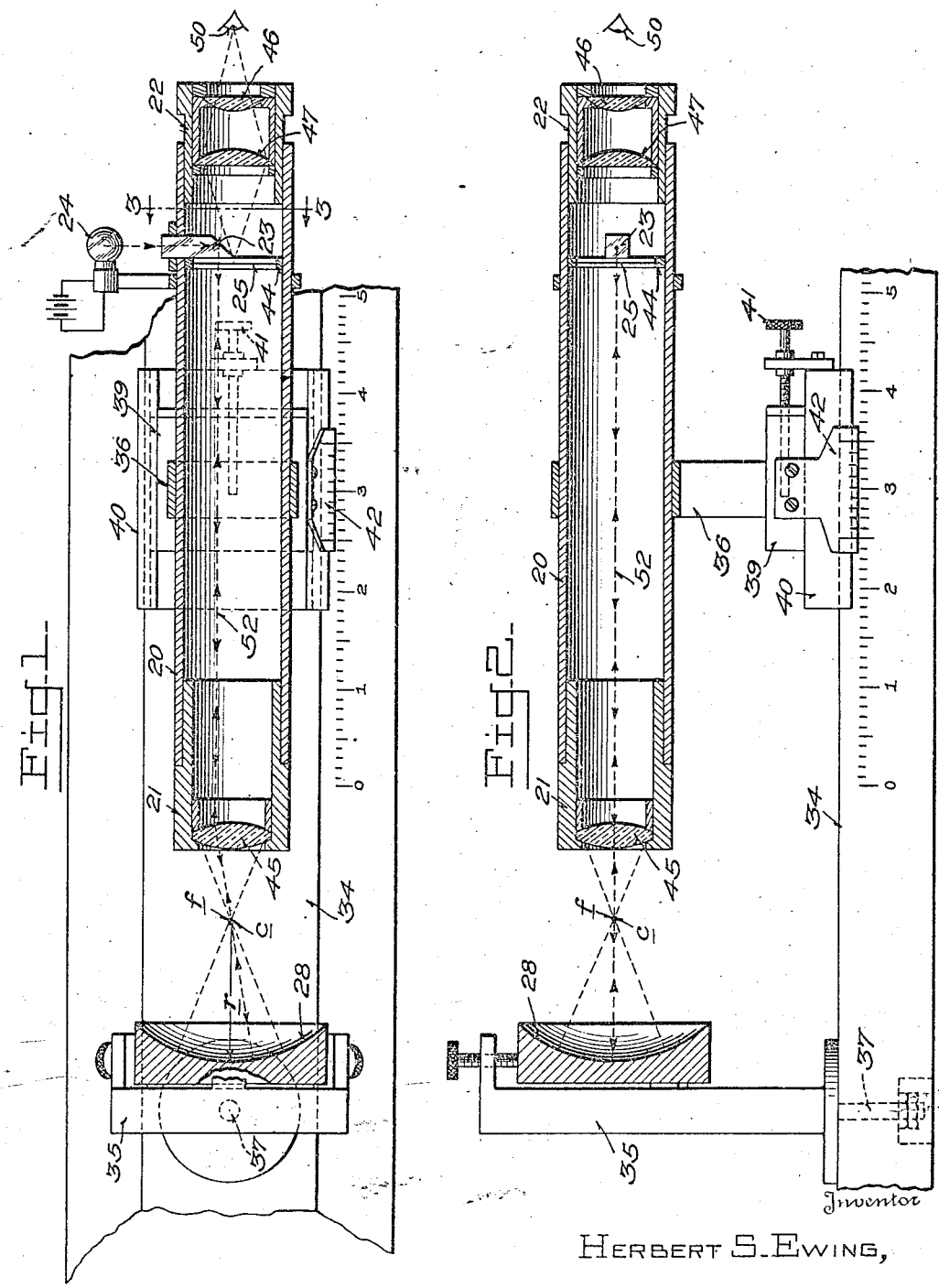
Inventor
Herbert S. Ewing,
By C. E. Herrstrom & N. E. Thibodeau
Attorneys

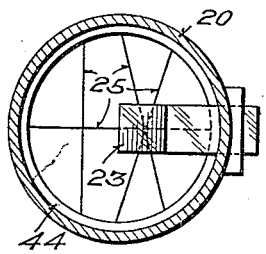
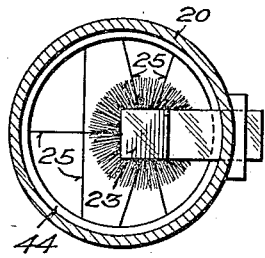
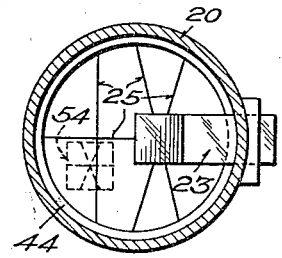
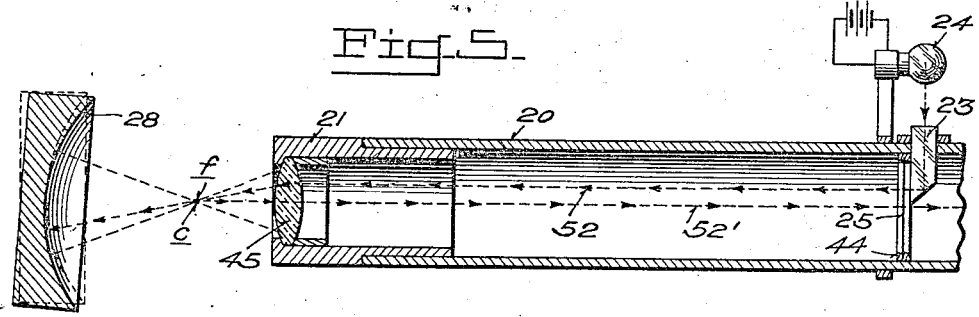
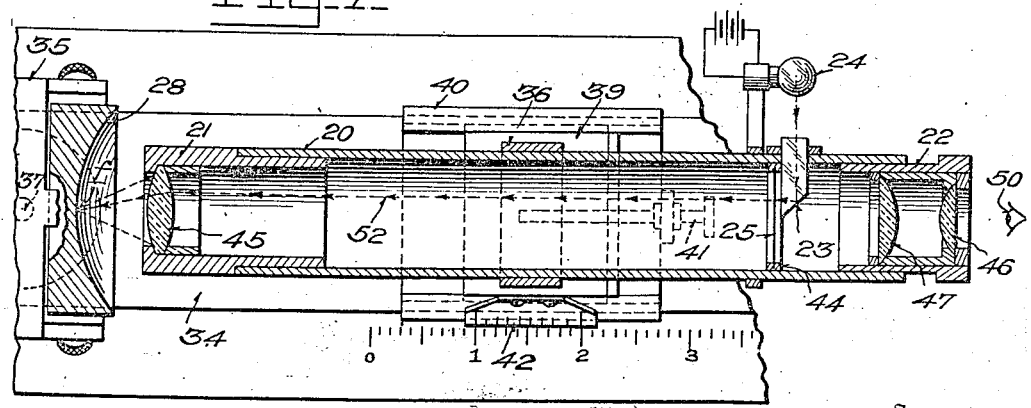

April 5, 1949.　　　　H. S. EWING　　　　2,466,015
APPARATUS FOR LOCATING REFLECTING SURFACES AND
FOR MEASURING THE CURVATURES THEREOF
Filed Sept. 29, 1944　　　　　　　　　　3 Sheets-Sheet 3
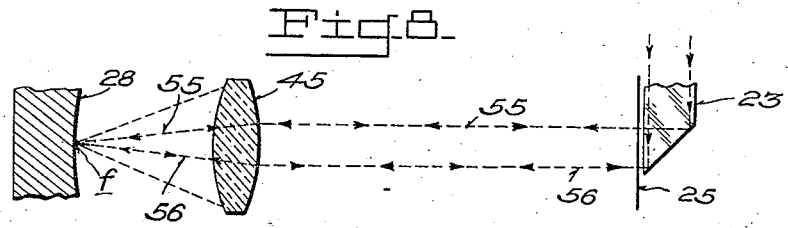
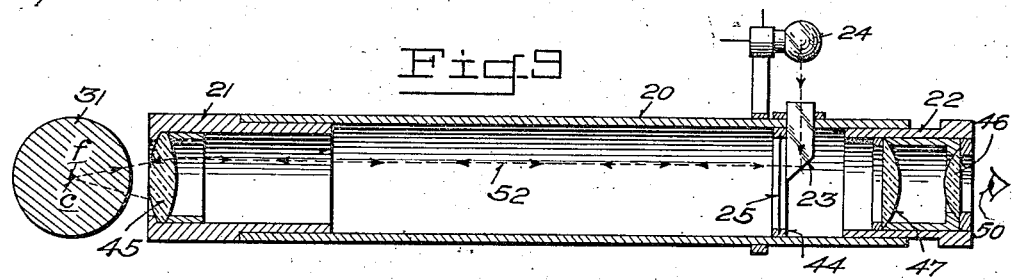
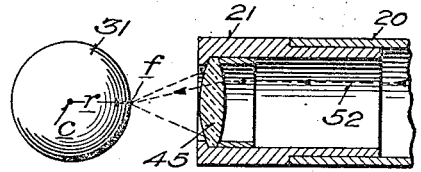
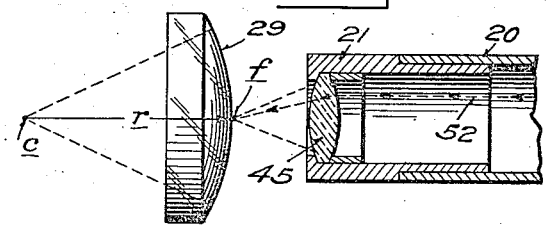
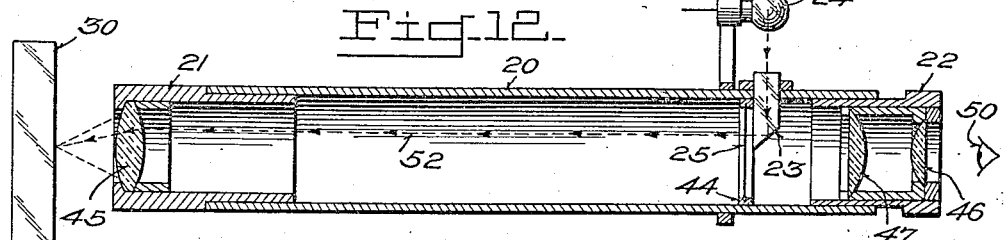
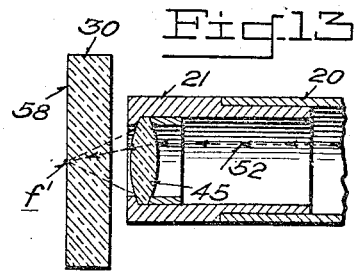
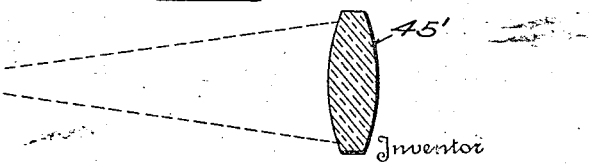
Inventor
HERBERT S. EWING, Patented Apr. 5, 1949

2,466,015

UNITED STATES PATENT OFFICE 2,466,015

APPARATUS FOR LOCATING REFLECTING SURFACES AND FOR MEASURING THE CURVATURES THEREOF

Herbert S. Ewing, Philadelphia, Pa.

Application September 29, 1944, Serial No. 556,436

6 Claims. (Cl. 88—14)

(Granted under the act of March 3, 1883, as amended April 30, 1928; 370 O. G. 757)

The invention described herein may be manufactured and used by or for the Government for governmental purposes, without the payment to me of any royalty thereon.

My invention relates to reflecting surfaces of optical and other elements and it has special reference to means for locating such surfaces and for measuring the curvatures thereof.

Broadly stated, the object of my invention is to provide improved apparatus by which the location and the curvature of surfaces of glass, metal or other material capable of reflecting light may readily be determined.

A more specific object is to facilitate accurate location of reflecting surfaces having a wide variety of shapes and contours including flat, concave and convex.

Another object is to facilitate curvature measurement of reflecting surfaces having either concave or convex contour and being a part of mirrors, optical lenses, metal balls, sections thereof, and other elements of various shapes and materials.

Further objects are to increase the accuracy and reliability with which such location and measurement may be effected; to simplify procedure of the named operations and to reduce the time and skill required therefor; and to lower the cost of and simplify the apparatus needed thereby.

In practicing my invention I attain the foregoing and other objects by the aid of a specially constructed instrument of the microscope type. This instrument has the usual objective and eyepiece lenses but is supplemented by a prism through which light from an external source is introduced into the instrument tube. There this light is directed forwardly past cross hairs in the eyepiece's focal plane and projected out of the instrument through the objective lens.

The reflecting surface to be located and measured is placed in the path of these projected light rays where it serves to reflect some of the rays back through the objective into the instrument tube and thence rearwardly. An observer looks at these reflected rays through the eyepiece and adjusts the spacing between the instrument's objective and the reflecting surface until a sharply distinctive appearance of what he sees tells him that the objective's focal point is exactly coincident with the center of curvature of the surface being observed. Having so positioned the instrument with respect to that surface, a first distance reading is taken.

The observer next brings the instrument objective's focal point into coincidence with the reflecting surface itself. In the case of a concave surface this is done by advancing the instrument towards the surface until a second distinctive appearance of the reflected rays reaching the eyepiece tells the observer that the condition stated has been realized; in the case of a convex surface the same result requires that the instrument be backed away. A second distance reading is now taken. Subtraction with respect to the first gives the reflecting surface's radius of curvature.

Illustrative embodiments of my improved apparatus are shown by the accompanying drawings wherein:

Fig. 1 is a top plan view partly in section showing one form of instrument and mounting by which my invention may be practiced;

Fig. 2 is a view in side elevation of the same instrument adjusted on the center of curvature of a concave lens;

Fig. 3 is a section on Fig. 1's line 3—3 showing the instrument's prism and cross hairs as viewed from the rear;

Fig. 4 represents the light "halo" which develops around the prism under non-coincident positionings of the instrument;

Figs. 5 and 6 show how coincident positioning may be detected in a slightly different manner;

Fig. 7 shows the instrument of Fig. 1 adjusted on the surface of the concave lens being measured;

Fig. 8 illustrates certain optical phenomena believed to accompany the surface location of Fig. 7;

Fig. 9 indicates how the observing instrument is able to locate the center of a metal sphere;

Fig. 10 shows adjustment of the instrument on the surface of the Fig. 9 sphere;

Fig. 11 shows adjustment on the surface of a convex lens;

Fig. 12 indicates how the reflecting surface of a flat object may be located;

Fig. 13 shows adjustment of the instrument on the second surface of the transparent object of Fig. 12; and Fig. 14 represents an instrument objective lens having increased focal length.

*The surface observing instrument and mount*

The surface observing instrument preferred for the practice of my invention is of a specially constructed microscope type. In the illustrative form which Figs. 1-2 show this instrument utilizes a hollow tube 20 carrying an objective lens holder 21 in its forward end and an eyepiece or ocular 22 at its rear; a prism 23 extending through the tube's side slightly ahead of the eyepiece and serving to bring into the tube and project forwardly therethrough rays of light from an external source 24; and cross hairs 25 located in the eyepiece's focal plane just ahead of the prism.

This instrument is mounted for adjustable movement toward and away from the reflecting surface to be observed. Figs. 1–2, 4 and 5–7 illustrate this surface as being part of a concave lens 28. As the description proceeds it will be seen that the surface may also be part of a convex lens as shown at 29 in Fig. 11; or part of a flat object as shown at 30 in Figs. 12–13; or part of a metal sphere as shown at 31 in Figs. 9–10; or part of any other object (not shown), regardless of material or shape, which is capable of reflecting light.

The named mount for the observing instrument may be of the vertical "microscope" type (not shown) or have the horizontal "lens bench" form which Figs. 1–2 illustrate. There a horizontal bench bar 34 supports an object holding fixture 35 and an instrument bracket 36 in adjustably spaced relation with respect to each other. In the arrangement shown the fixture 35 is stationary except for a rotative adjustment about base bolt 37.

The instrument bracket 36, however, is movable along bench bar 34 toward and away from the object holder 35. Making this movement possible are top and intermediate bracket bases 39 and 40 which may manually be pushed along bar 34 to effect approximate positioning adjustments of instrument 20, and which also may be moved by vernier screw 41 with respect to each other to effect finer adjustments in the instrument's position.

A lens bench of this type holds the instrument's optical axis parallel to the bench bar 34 regardless of where it is positioned therealong. Once, therefore, the object 28 to be observed has been "squared off," in its supporting fixture 35, and centered with respect to that axis, such relation is continued even though the instrument be brought closer to or backed away from the object.

For measuring the distance at which the instrument is so adjusted from the object, the bench bar 34 may conveniently be marked with the represented scale graduations and an extension 42 from the instrument's support 39 may carry vernier markings for registry with the bench bar's distance graduations as illustrated. As the description proceeds it will be seen that other scale arrangements also are useable.

*The instrument's optical elements*

As illustratively here shown, instrument tube 20 so receives objective lens holder 21 in its forward end as to permit removal and substitution of other objective holders, and so receives eyepiece holder 22 in its rearward end as to permit interchange with other oculars of similar physical dimensions. Optionally, of course, objective and eyepiece elements of satisfactory optical characteristics may be permanently mounted in the tube's two ends.

The objective element in the forward holder 21 has been represented as a simple lens 45. Such representation is intended to typify objective elements having focal length and magnification characteristics of wide variety. In practice highly corrected compound lenses preferably are here used. One three-lens objective which has satisfactorily been so employed is shown by Sabel Patent 1,557,503 (expired), issued October 13, 1925.

That illustrative objective has a focal length of 0.25 inch and a magnifying power of 10. As the description proceeds it will be seen that objectives having greater or lesser focal lengths and greater or lesser magnifying powers also are useable for the surface observing purposes here disclosed.

The eyepiece or ocular in the instrument tube's rear holder 22 has been shown as including an eye lens 46 plus a field lens 47. This illustrative ocular is of the "Ramsden" type in which the two lenses have equal focal lengths, are separated by a distance of about two thirds that length, and have a combined magnifying power of about 10. Multiplying this ocular power by objective lens 45's magnifying power, also illustratively stated to be 10, gives 100 magnifications as the described instrument's total power.

The image to be magnified by the represented ocular 22 is formed in front of field lens 47 and in a plane illustratively shown as being coincident with the instrument's cross hairs 25. Oculars of other types and of other magnifying powers are, of course, useable. One requirement, however, which must be met in all instances is that the ocular's focal plane be spaced in front of the field lens 47 by a distance great enough to accommodate the earlier mentioned prism 23 between that focal plane (see cross hairs 25) and the lens.

As already stated, the purpose of prism 23 is to bring into the instrument tube 20 and forwardly direct therethrough light from an external source here illustratively shown as an electric bulb 24. This prism has the physical shape shown and is secured in a mating opening through the instrument tube's side just back of ocular 22's focal plane. The material thereof preferably is optical glass.

The prism's inner end is cut to a 45° angle and coated with silver or other light reflecting material. Light from source 24 enters the prism's square outer end, strikes the 45° reflecting surface, is thereby directed forwardly through the instrument's tube 20, and is by objective lens 45 projected out of the tube's forward end. In leaving prism 23 that light passes through such portions of cross hairs 25 as are in its path.

Those cross hairs may satisfactorily be arranged as shown by Fig. 3. That arrangement utilizes suspension across tube 20 between attachments to a ring 44 snugly fitted inside the tube. Other forms of support may of course be used. Mounting on a glass disc or reticle is, however, found to be unsatisfactory because of objectionable reflecting properties of the surfaces of such glass.

Preferable positioning of these cross hairs 25 is just ahead of (or even in contact with) the forward surface of prism 23. In conditioning the instrument for operation eyepiece 22 is adjusted to give a sharp image of the cross hairs. This assures that the eyepiece's focal plane and the cross hairs are in fact coincident. Under this condition images formed in the plane of the cross hairs are clearly visible to the observer's eye 50.

*Locating centers of curvature*

In measuring the radius of curvature of a reflecting surface (either concave or convex) the first step is to bring the focal point of the instrument's objective lens into coincidence with the surface's center of curvature. This condition is shown by each of Figs. 1-2 where the focal point of objective lens 45 is designated as *f* and the center of curvature of lens 28's concave surface (facing instrument 20) is designated as *c*.

The lens or other object whose surface is to be observed is first squared off and centered with respect to the optical axis of instrument 20. In the case of a concave lens of the type shown at 28 the necessary positioning of the lens in holder 35 may be aided by removing both the eyepiece 22 and the objective 21 from the instrument. Looking through tube 20 with the naked eye there will now be seen on the lens surface 28 a spot of light projected thereagainst by prism 23 from source 24.

Centering is effected by sidewise adjustment of the lens in its holder 35 until this spot appears in the exact center of tube 20; squaring off is effected by tilt adjustment until the separate images of the spot reflected from the lens' first and second surfaces merge into a single image. Under these conditions the optical axis of the lens coincides with that of the instrument.

The objective and eyepiece holders 21 and 22 are now reinserted into tube 20; the eyepiece is adjusted until the tube's cross hairs 25 are sharply visible therethrough; and the instrument is then backed away from the lens by a distance estimated to be greater than that shown in Figs. 1-2 as being the sum of the objective's focal length and the surface's radius of curvature *r*. In looking into the eyepiece the observer now sees the cross hairs and interior of the tube (see Fig. 3) under faint general illumination.

The instrument is next slowly moved toward the lens. As the objective's focal point *f* gets close to the surface's center of curvature *c* there begins to appear around the edges of prism 23 intensified illumination which forms a "halo" of the type shown by Fig. 4. With continued movement of the instrument this halo brightens and becomes most brilliant immediately before the focal point *f* coincides with curvature center *c*. It then sharply disappears behind the prism just as point *f* moves into exact coincidence with point *c*.

Further movement of the instrument towards surface 28 causes the halo of Fig. 4 to reappear around the prism. This reappearance is again sharp and it reaches maximum brightness upon only a slight departure from focal point and curvature center coincidence. Continued advancement of the instrument towards the surface decreases the halo's brightness and soon eliminates it altogether. The observer once more gets the view of Fig. 3 under very slight general illumination.

The "halo" method of curvature center location just described is exceedingly accurate, and dependable measurements as fine as 0.001 inch can in practice reliably be made. Based on extensive use of the observing instrument over a period of months my present analysis of the halo's optical phenomena is as follows.

Under the "coincident" conditions shown by Figs. 1-2 each ray of light 52 emanating from objective 45 passes through points *f* and *c* and strikes the reflecting surface 28 exactly perpendicular. This produces reflection back into the instrument along the very path taken by the ray in leaving prism 23 and coming out of the objective; hence the double arrows along ray path 52.

The reflected image of prism 23 thus is projected in its entirety back into the prism and so cannot be seen through eyepiece 22 in cross hair plane 25. This accords with actual behavior as earlier described.

Under slightly separated conditions of points *f* and *c* the projected rays from objective 45 no longer strike surface 28 at exact 90° angles and hence their return paths into the instrument are sufficiently divergent to expand the reflected image of prism 23 and thereby make the outer portions of that reflection visible around the prism's physical edges, as shown in Fig. 4. Hence the "halo" observations earlier described.

As the separation between points *f* and *c* becomes wider a majority of the instrument's projected rays impinge upon surface 28 at such substantial variance from the perpendicular that very few of them can be reflected back into the instrument. No visible halo is therefore now present and only slight general illumination of cross hair plane 25 can be seen through the eyepiece. This also accords with actual behavior as earlier described.

*Center detection by reflected image*

An even more accurate indication of when the instrument objective's focal point *f* has been brought into exact coincidence with surface 28's center of curvature *c* may be had under the conditions which Figs. 5-6 show. There the surface 28 being observed has been slightly tilted (full lines) out of the exactly squared off position (dotted lines) illustrated by Figs. 1-2.

By reason of this slight tilt the image of prism 23 which surface 28 reflects during coincidence of *f* and *c* goes back into the instrument along some slightly displaced path which Fig. 5's return ray 52' may be assumed to typify. It now does not reenter the prism (as in Figs. 1-2) but instead appears in cross hair plane 25 as a sharp image 54. In size and contour this image exactly duplicates the dimensions and shape of that portion of the prism by which light is forwardly directed through tube 20; under sharply focussed conditions even the cross hairs 25 can be seen (shown dotted in 54) in the prism's image so reflected.

This "reflected image" method of coincidence detection will in most instances be found preferable to "halo observation" as earlier described. It permits, for example, adjustment of point *f* upon point *c* to be made with even greater accuracy than before. This is because the fineness of that adjustment now is measured by the sharpness of reflected image 54 (Fig. 6) rather than by the absence of that image's distortion (halo of Fig. 4) beyond the physical edges of prism 23.

Conditioning of the observing instrument setup therefore may be made not only by tilting the reflecting surface 28 slightly as in Fig. 5, but also by shifting the surface's optical center very slightly out of coincidence with the observing instrument's optical axis. In either case the needed departure is very small. Too much displacement must, in fact, be guarded against since same will bring the reflected image completely out of the eyepiece's field of view.

As in the "halo observation" method of center of curvature detection, prism 23's reflected image 54 (Fig. 6) becomes distorted and enlarged as objective focal point *f* is moved in either direction from exact coincidence with surface 28's center of curvature *c*. When departure becomes too great, image 54 disappears altogether and only faint general illumination then is visible through eyepiece 22.

Having so coincided (by either method) the instrument objective's focal point $f$ with surface 28's center of curvature $c$, a first distance reading is taken. In the illustrative setup of Figs. 1-2 such a reading has the value of 2.50 inches. Record of this instrument position is made for later use in determining the value of surface 28's radius of curvature $r$.

*Location of reflecting surfaces*

The next step is to bring the instrument objective's focal point $f$ into coincidence with the reflecting surface 28 itself. This condition is shown by Fig. 7. Except for having been brought closer to the surface being observed the instrument's adjustment remains unchanged, and the objective's focal point $f$ thus is spaced from the instrument exactly the same as before.

Hence, with point $f$ located on the reflecting surface 28, the instrument 20 has been brought closer to that surface by exactly the length of the surface's radius of curvature $r$ (see Fig. 1). A second distance reading is now taken. In the illustrative setup of Fig. 7 such a reading has the value of 1.00 inch. Subtracting this from the first reading (Figs. 1-2) of 2.50 inches gives 1.50 inches as the measured radius of curvature of concave surface 28.

The foregoing presupposes accurate location of objective 45's focal point $f$ on surface 28. By my invention such accurate location may be made with relative ease and high reliability. Necessary procedure will now be described.

Starting with the instrument spaced from surface 28 by more than Fig. 7 shows, slow advancement toward that surface is made. The cross hairs and tube interior of Fig. 3 at first appear under faint general illumination only; however, as the objective's focal point $f$ gets close to surface 28 there begins to appear around the edges of prism 23 intensified illumination which forms into the Fig. 4 halo.

With continued advancement of the instrument this halo brightens and reaches highest brilliancy just before the focal point $f$ coincides with surface 28. It then sharply disappears behind prism 23 just as point $f$ moves into exact coincidence with the surface. The observer's eye 50 then sees only the pattern of Fig. 3.

Further movement of the instrument towards surface 28 causes the halo of Fig. 4 to reappear around the prism. This reappearance is again sharp and it reaches maximum brightness upon only a slight focussing of point $f$ beneath the surface being located. Continued advancement of the instrument towards that surface decreases the halo's brightness and soon eliminates it altogether. The observer once more gets the view of Fig. 3 under very slight general illumination.

By this "halo" method it is thus possible to locate reflecting surfaces with much higher accuracies than have heretofore been possible. Dependable measurements finer than 0.001 inch can in practice reliably be made. Squaring off and centering requirements of the observed surface are much less critical than those earlier explained for center of curvature location, and the observed halos are even more intense and hence even more readily discernible.

The optical phenomena believed to take place may best be explained by reference to the enlarged diagram of Fig. 8. Under the "coincident" conditions depicted by Figs. 7-8 all rays of light emanating from objective 45 converge on the surface 28 at focal point $f$. Fig. 8 shows at 55 and 56 two such rays which respectively come from the upper and lower portions of prism 23's reflecting area.

The upper ray 55 strikes surface 28 at such an angle as to reflect back along the path of lower ray 56; that lower ray so strikes the surface as to reflect back into the instrument along the path of upper ray 55; and intermediate rays (not shown) in both planes behave in such similar manner that the image of prism 23 reflected from surface 28 goes back into the instrument in inverted form but otherwise along the paths of the projected rays which produced it. In consequence the reflected image of prism 23 thus is projected in its entirety back into the prism and so cannot be seen through eyepiece 22 in cross hair plane 25. This accords with actual behavior as earlier described.

Under slight separation (in either direction) of focal point $f$ from the surface 28, the projected rays from objective 45 no longer strike that surface at the angles necessary to set up the conditions shown by Fig. 8. Their return paths into the instrument now are sufficiently divergent to expand the reflected image of prism 23 and thereby make the outer portions of that reflection visible around the prism's physical edges, as shown in Fig. 4. Hence the "halo" observations earlier described.

As the separation (again in either direction) between focal point $f$ and surface 28 becomes wider a majority of the instrument's projected rays impinge upon that surface at such substantial angular variance from the Fig. 8 condition that very few of them can be reflected back into the instrument. No visible halo is therefore now present and only slight general illumination of cross hair plane 25 can be seen through the eyepiece. This also accords with actual behavior as earlier described.

Reflecting surfaces other than that of concave contour shown at 28 also may be located by my improved "halo" method. This method thus is useable to locate convex surfaces of the type shown by Figs. 10 and 11 at 31 and 29; or flat surface such as Figs. 12 and 13 show at 30 and 58.

In each of these further instances the procedure duplicates that already described, and the optical phenomena also is believed to be the same. Objective 45's focal point $f$ contacts such a small area of any observed surface that same may be considered flat. Thus concave, convex and flat reflecting surfaces all react the same. Actual use of the "halo" locating method upon a wide variety of reflecting surface contours bears this out very convincingly.

Even plain white paper is found to produce the halo effects under discussion. Such paper when observed through the instrument sets up around prism 23 halos (see Fig. 4) which are somewhat less sharp and intense than those gotten from glass, polished metal and other highly mirrored surfaces. They are, however, sufficiently distinct to enable surface location of the paper reliably and accurately to be made through a practice of my "halo disappearance" technique.

In the case of transparent objects, location of the "second" or under reflecting surface also is possible. This may be done as shown in Fig. 13. There the instrument objective's focal point $f'$ has been coincided with transparent object 30's second surface 58.

Instrument positioning by "halo disappearance" is exactly the same as that described for location of "first" surfaces. Since, however, the instrument's projected rays pass through object 30's glass or other transparent material, the spacing from objective 45 of Fig. 13's focal point $f'$ can be expected to be somewhat different than the constant value represented for $f$ in the earlier views.

*Curvature measurement of convex surfaces*

It has been seen how concave reflecting surfaces, typified by lens 28 of Figs. 1-2, 5, 7, 8 may have their radii of curvature accurately measured by the improved apparatus of my invention. Convex surfaces also may have their radii of curvature measured with equal facility, as Figs. 9-10 illustratively show.

There a sphere 31, of polished steel or other reflecting surface material, is shown as the object to be so measured. One requirement to be met here is that the convex surface's radius of curvature $r$ (Fig. 10) not exceed the spacing of focal point $f$ from the instrument's objective lens 45. Reason for this requirement is further discussed later. As in the case of concave surface measurements, the objective's focal point $f$ is successively coincided with the convex surface's center of curvature $c$ and then with the surface itself; the instrument's position with respect to the convex surface is in each case measured in terms of spacing distance; and the smaller of these two distances is subtracted from the larger to give the surface's radius of curvature $r$.

Bringing of the instrument objective's focal point $f$ into coincidence with the convex surface's center of curvature $c$ may best be explained by reference to Fig. 9. There the spherical object 31 is shown as having been squared off and centered with respect to the optical axis of instrument 20.

Starting with the instrument spaced from object 31's surface by a distance estimated to be greater than that shown in Fig. 9, slow movement toward that surface is then begun. In looking into eyepiece 22 the observer first sees the cross hair and prism pattern of Fig. 3 under faint general illumination.

As the objective's focal point $f$ gets close to the surface's center of curvature $c$ there begins to appear around the edges of prism 23 intensified illumination which forms into the Fig. 4 halo. With continued movement of the instrument this halo brightens and becomes most brilliant immediately before the focal point $f$ coincides with curvature center $c$. It then sharply disappears behind the prism just as point $f$ moves into exact coincidence with point $c$.

Further movement of the instrument towards surface 31 causes the halo of Fig. 4 to reappear around the prism. This reappearance is again sharp and it reaches maximum brightness upon only a slight departure from focal and curvature point coincidence. Continued advancement of the instrument towards surface 31 decreases the halo's brightness and soon eliminates it altogether. The observer once more gets the view of Fig. 3 under very slight general illumination.

The foregoing "halo" phenomena take place regardless of whether the sphere 31 is of transparent material such as glass or of non-transparent material such as steel. In either case it is not necessary that the objective's focal point $f$ physically penetrate into the sphere's center. Even though (as in the case of a steel sphere) no light goes beneath reflecting surface 31 the conditions described continue to hold true. This may be explained as follows.

Under the "coincident" conditions shown by Fig. 9 each ray of light 52 emanating from objective 45 strikes the convex surface 31 exactly perpendicular. This produces reflection back into the instrument along the very path taken by the ray in leaving prism 23 and coming out of the objective; hence the double arrows along Fig. 9's ray path 52. The reflected image of prism 23 thus is projected in its entirety back into the prism and so cannot be seen through eyepiece 22 in cross hair plane 25.

Upon slight departures in either direction from the "coincident" conditions of Fig. 9, the projected rays from objective 45 no longer strike surface 31 at exact 90° angles and hence their return paths into the instrument are sufficiently divergent to expand the reflected image of prism 23 and thereby make the outer portions of that reflection visible as the Fig. 4 halo around the prism's physical edges. As the departure becomes greater a majority of the instrument's projected rays impinge upon surface 31 at such substantial variance from the perpendicular that very few of them can now be directed back into the instrument, and the visible halo therefore disappears.

The just described "halo observation" method of curvature center location requires that the convex surface 31 under examination be centered and squared off with respect to the instrument's optical axis. Even more accurate location of that surface's curvature center $c$ is possible by use of the alternate "reflected image" method earlier described (for concave surfaces) by reference to Figs. 5-6.

To condition the observing setup of Fig. 9 for practice of the latter method it is only necessary to shift the sphere 31 slightly to one side, and thereby bring the reflected image of prism 23 from in front of the prism and into view through the instrument's eyepiece. That reflected image no longer reenters the prism but instead appears in cross hair plane 25 as an illuminated area represented at 54 in Fig. 6.

In size and contour this image 54 as so reflected from convex surface 31 exactly duplicates the dimensions and shape of that portion of prism 23 by which light is forwardly directed through tube 20; under sharply focussed conditions even the cross hairs 25 can be seen (shown dotted within 54 of Fig. 6) in the prism's image so reflected.

As objective focal point $f$ is moved in either direction from exact coincidence with convex surface 31's center of curvature $c$, prism 23's reflected image 54 (Fig. 6) becomes distorted and enlarged. When departure becomes too great that image 54 disappears altogether and only faint general illumination then is visible through eyepiece 22.

Having so coincided (by either method) the instrument objective's focal point $f$ with convex surface 31's center of curvature $c$, a first distance reading of the instrument's position (Fig. 9) is taken. Such reading is obtainable from position registering scales (not shown in Fig. 9) of the type illustrated by Figs. 1-2 and 7. To facilitate explanation it will be assumed that this Fig. 9 reading has the value of 0.50 inch.

The next step is to bring the instrument objective's focal point $f$ into coincidence with the convex surface 31 itself. This condition is shown by Fig. 10. All operations incident thereto already having been explained, the same will not be repeated here. A second distance reading of the instrument's position (Fig. 10) is now taken.

Assuming it to have the value of 1.00 inch, subtraction therefrom of the first reading (Fig. 9) of 0.50 inch gives 0.50 inch as the measured radius of curvature $r$ of convex surface 31. Since the complete sphere's diameter is equal to $2r$, a diameter figure of 1.00 inch has at the same time been ascertained.

Quite obviously the complete sphere need not be available in order to permit curvature measurement of any section of its surface. As long as the section under examination is large enough to permit proper support and alignment with respect to the observing instrument, radius of curvature measurement by the foregoing method may satisfactorily be made.

As earlier stated, the instrument objective's focal length or "working distance" must in each instance be greater than the curvature radius $r$ of the convex surface under observation. Reason for this may be seen from Fig. 11. Surface 29 of that figure has a radius of curvature $r$ so much greater than the focal length of objective 45 that point $f$ will fall far short of reaching point $c$ even when the instrument is brought as close to surface 29 as is physically possible.

To reach that surface's center will require use of a longer focal length objective such as Fig. 14 shows at 45'. That objective's focal point $f''$ being more widely spaced from lens 45' than is center of curvature $c$ from convex surface 29, radius of curvature measurement is possible therewith.

Summary

The improvements of my invention are characterized by high utility and broad application. By means of the apparatus here disclosed light reflecting surfaces identified with a wide variety of shapes, contours and materials may accurately be located and precisely measured for radius of curvature. Illustrative examples of the high degree of accuracy obtainable in actual practice are given below.

Thousands of polished spherical lenses of the concave type shown by Figs. 1-2 at 28 have been measured for curvature radius to accuracies consistently better than 0.001 inch. Best accuracies attainable with spherometers, steel and brass radius gages, and other test devices of the prior art have varied from 0.005 inch to 0.150 inch. In using my improved technique, moreover, different observers can repeat each other's measurements to the 0.001 inch accuracy first stated above.

The same applies to the location of glass and other reflecting surfaces. My "halo disappearance" technique completely eliminates an error characteristic of prior art surface locations wherein the operator has had to judge where the observed surface is by using scratches into the surface and hence beneath the level thereof, or by using lint and powder on the surface and hence protruding above the level thereof.

Another very practical advantage of my invention is that it simplifies and lowers the cost of surface locating and curvature radius measuring apparatus. Microscope type observing instruments of my unique design can be constructed at very moderate cost. When compared with the investment represented by spherometers, metal radius gages and other prior art devices this cost is so low as to make substantial savings possible.

At the same time the precision of measurement is increased, as already noted, and the skill called for on the part of operators is decreased. This results from the inherently simple construction of my observing instrument and its mount, and from the simplicity of technique in making observations. Mastery of this technique, even by an inexperienced operator, is found to require only a few hours of instruction and manipulation practice.

Spherometers and other measuring devices of the prior art have, by way of contrast, required much longer periods of instruction and more careful supervision in use. Even when manipulated with extreme skill, the accuracies obtainable by these prior art devices fall far short of those desirable and now made possible through use of my improved apparatus and technique.

From the foregoing it will thus be seen that I have provided improved apparatus by which the location and the curvature of surfaces of glass, metal or other material capable of reflecting light may readily be determined; that I have facilitated accurate location of reflecting surfaces having a wide variety of shapes and contours including flat, concave and convex; that I have facilitated curvature measurement of reflecting surfaces having either concave or convex contour and being a part of mirrors, optical lenses, metal balls, sections thereof and other elements of various shapes and materials; and that I have increased the accuracy and reliability with which such location and measurements may be effected, have simplified the procedure of the named operations and reduced the time and skill required therefor, and have lowered the cost of and simplified the apparatus needed thereby.

My inventive improvements are therefore extensive in their adaption and not to be restricted to the specific form here disclosed by way of illustration.

I claim:

1. In an instrument for observing a reflecting surface, the combination of, an instrument mount, an instrument tube supported by said mount, an objective lens carried by the forward end of said tube and having a focal point spaced externally of said tube from said end, an eyepiece carried by the other end of said tube and having a focal plane spaced ahead of the eyepiece within the tube, a relatively small prism extending through the wall of said tube intermediate said eyepiece and said focal plane and covering only a small portion of the field of view of said eyepiece and serving to transmit into the tube rays of light from an external source and to project same forwardly through the tube and thence outwardly therefrom through said objective lens, means for preventing the passage of light through said prism to said eyepiece, means also supported by said instrument mount for positioning a reflecting surface to be observed in the path of said projected light rays in such manner that a portion of those rays will be reflected from that surface back through said objective lens and into said instrument tube, the means supporting said tube on said mount being movably mounted thereon so as to permit relative movement therebetween in a direction parallel to the axis of the tube for adjusting the spacing between said objective lens and said surface whereby an observer viewing said reflected rays through said eyepiece is from sharply distinctive appearances thereof in the eyepiece's focal plane able to determine when said objective's focal point has been brought into coincidence with said surface or with the center of curvature thereof.

2. In an instrument for observing a reflecting surface and locating same, the combination of, an instrument mount, an instrument tube supported by said mount, an objective lens carried by the forward end of said tube and having a focal point spaced externally of said tube from said end, an eyepiece carried by the other end of said tube and having a focal plane spaced ahead of the eyepiece within the tube, a relatively small prism extending through the wall of said tube intermediate said eyepiece and said focal plane and covering only a small portion of the field of view of said eyepiece and serving to bring into the tube rays of light from an external source and to project same forwardly through the tube and thence outwardly therefrom through said objective lens, means for preventing the passage of light through said prism to said eyepiece, means also supported by said instrument mount for positioning a reflecting surface to be observed in the path of said projected light rays in such manner that a portion of those rays will be reflected from that surface back through said objective lens and into said instrument tube, the means supporting said tube on said mount being movably mounted thereon so as to permit relative movement therebetween in a direction parallel to the axis of the tube for adjusting the spacing between said objective lens and said surface whereby an observer viewing said reflected rays through said eyepiece is from a sharply distinctive appearance thereof in the eyepiece's focal plane able to determine when said objective's focal point has been exactly brought into coincidence with that surface, and measuring means, a part of which is connected with said mount, for registering the position of said instrument tube with respect to said surface.

3. In an instrument for observing a reflecting surface and locating same, the combination of, an instrument mount, an instrument tube supported by said mount, an objective lens carried by the forward end of said tube and having a focal point spaced externally of said tube from said end, an eyepiece carried by the other end of said tube and having a focal plane spaced ahead of the eyepiece within the tube, a relatively small prism extending through the wall of said tube intermediate said eyepiece and said focal plane and covering only a small portion of the field of view of said eyepiece and serving to bring into the tube rays of light from an external source and to project same forwardly through the tube and thence outwardly therefrom through said objective lens, means for preventing the passage of light through said prism to said eyepiece, means also supported by said instrument mount for positioning a reflecting surface to be observed in the path of said projected light rays and with its optical axis substantially coincident with that of said instrument tube whereby there is reflected from the surface back through said objective lens and into the instrument tube an image of said prism which is by the prism itself blocked from view through said eyepiece when said objective lens' focal point is accurately coincided with said surface but which expands as a halo around said prism's edges and hence become visible through the eyepiece when the named condition of coincidence is only slightly departed from in either direction, the means supporting said tube on said mount being movably mounted thereon so as to permit relative movement therebetween in a direction parallel to the axis of the tube for adjusting the spacing between said objective lens and said surface whereby an observer looking into said eyepiece can from the aforesaid halo effect there seen bring said objective's focal point into accurate coincidence with said surface.

4. In an instrument for observing a reflecting surface and locating the center of curvature thereof, the combination of, an instrument mount, an instrument tube supported by said mount, an objective lens carried by the forward end of said tube and having a focal point spaced externally of said tube from said end, an eyepiece carried by the other end of said tube and having a focal plane spaced ahead of the eyepiece within the tube, a relatively small prism extending through the wall of said tube intermediate said eyepiece and said focal plane and covering only a small portion of the field of view of said eyepiece and serving to bring into the tube rays of light from an external source and to project same forwardly through the tube and thence outwardly therefrom through said objective lens, means also supported by said instrument mount for positioning a reflecting surface to be observed in the path of said projected light rays and with its optical axis very slightly displaced from that of said instrument tube whereby there is reflected from the surface back through said objective lens and into the instrument tube an image of said prism which is sharply visible through said eyepiece in the said focal plane thereof when said objective lens' focal point is accurately brought into coincidence with the reflecting surface's said center of curvature but which becomes blurred and indistinct when the named condition of coincidence is only slightly departed from in either direction, the means supporting said tube on said mount being movably mounted thereon so as to permit relative movement therebetween in a direction parallel to the axis of the tube for adjusting the spacing between said objective lens and said surface whereby an observer looking into said eyepiece can by the aid of the aforesaid reflected prism image there seen bring said objective's focal point into accurate coincidence with said reflecting surface's center of curvature.

5. In an instrument for determining the radius of curvature of an object having a curved reflecting surface, an optical viewing device comprising a mounting tube, an objective lens and an ocular lens in and adjacent respective ends of said tube, cross hairs mounted within said tube between said lenses and substantially in the focal plane of said ocular, means closely adjacent said cross hairs to project light forwardly through said objective onto the spherical reflecting surface of said object, a holder mounting the object, a holder for said viewing device, a bench bar mounting said holders for relative translation toward and from each other along the optical axis of said device focal point of said objective lens can be brought into coincidence with said reflecting surface or with its center of curvature, and measuring means carried by said bar and one of said holders to determine the distance of said relative translation.

6. In an instrument for determining the radii of curvature of objects having spherical reflecting surfaces, a viewing device comprising a tube, an objective lens and an ocular lens mounted in said tube, each adjacent one end thereof, cross hairs mounted in said tube in the focal plane of said ocular lens, means closely adjacent said cross hairs to project light forwardly along the optical axis of said device and through said objective lens onto the spherical surface of an object, a support having a scale thereon, a holder carried by said support for supporting an object thereon, a top bracket and an intermediate bracket slidable on said support toward and from said holder supporting an object, means operable to relatively adjust said brackets in said direction, means mounting said device on said top bracket with its optical axis parallel to said top bracket in cooperative relation with said scale.

HERBERT S. EWING.

REFERENCES CITED

The following references are of record in the file of this patent:

UNITED STATES PATENTS

| Number | Name | Date |
|---|---|---|
| 1,736,682 | Tuckerman | Nov. 19, 1929 |